W. FRIBERG.
BRICK SPREADER PALLET AND TRUCK THEREFOR.
APPLICATION FILED DEC. 3, 1907.
914,262.
Patented Mar. 2, 1909.
3 SHEETS—SHEET 3.
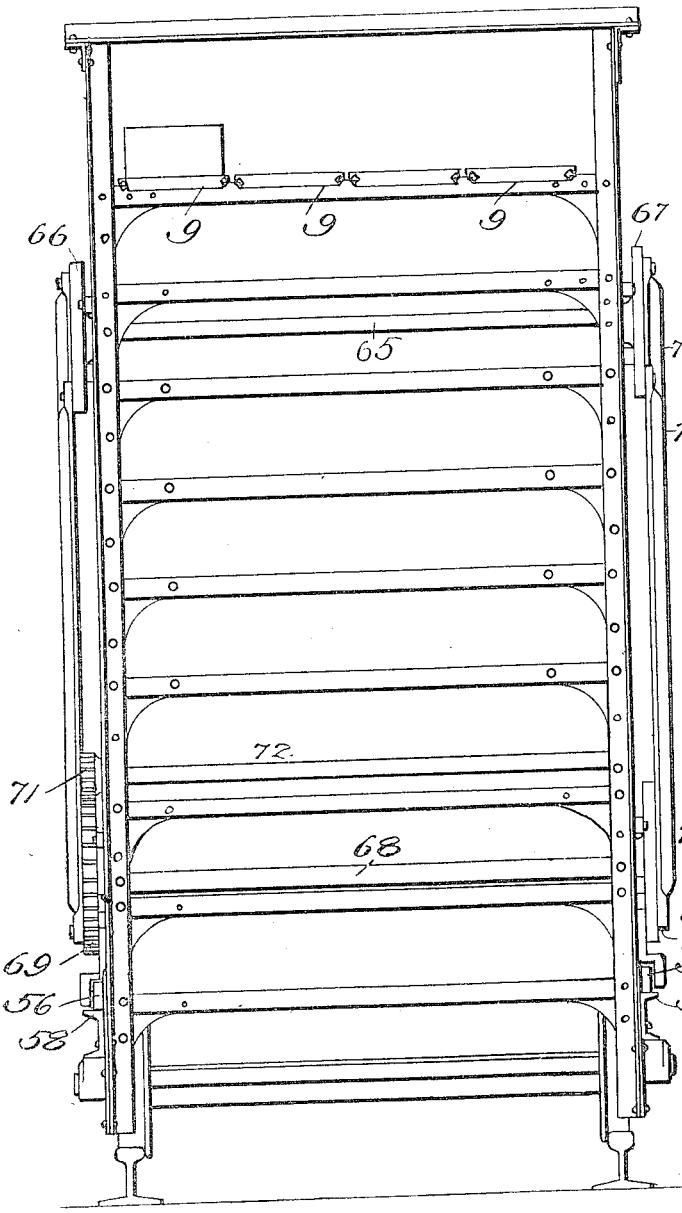
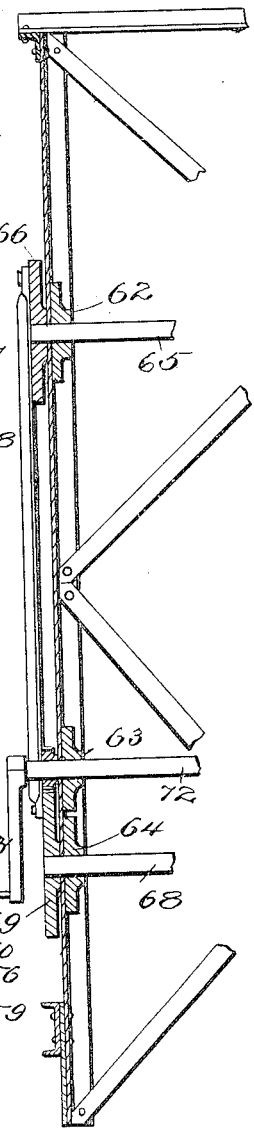
Witnesses
M. J. Stamp.
A. L. Kitchin.
Inventor
William Friberg
By Mason Fenwick & Lawrence.
his Attorneys

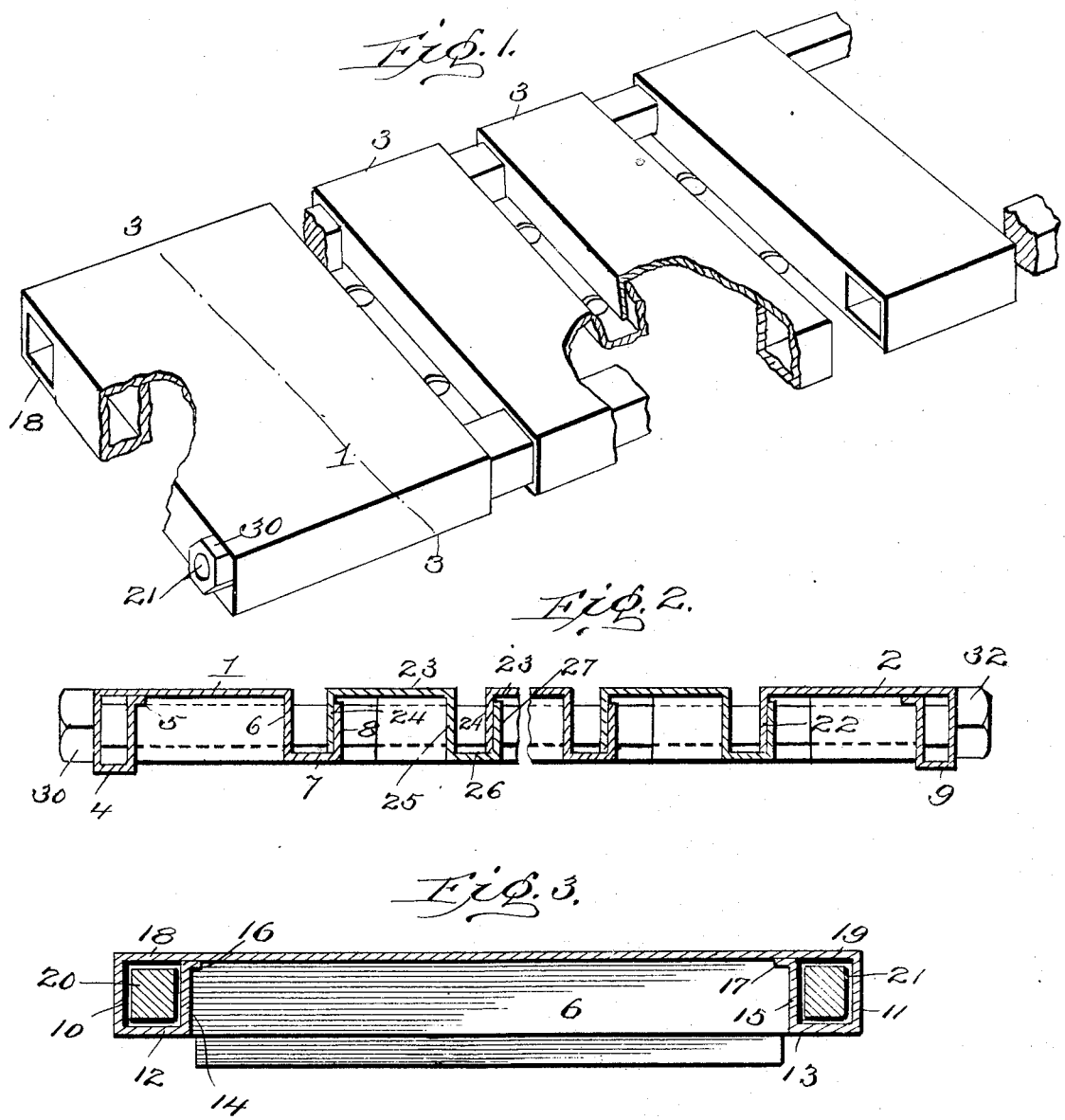

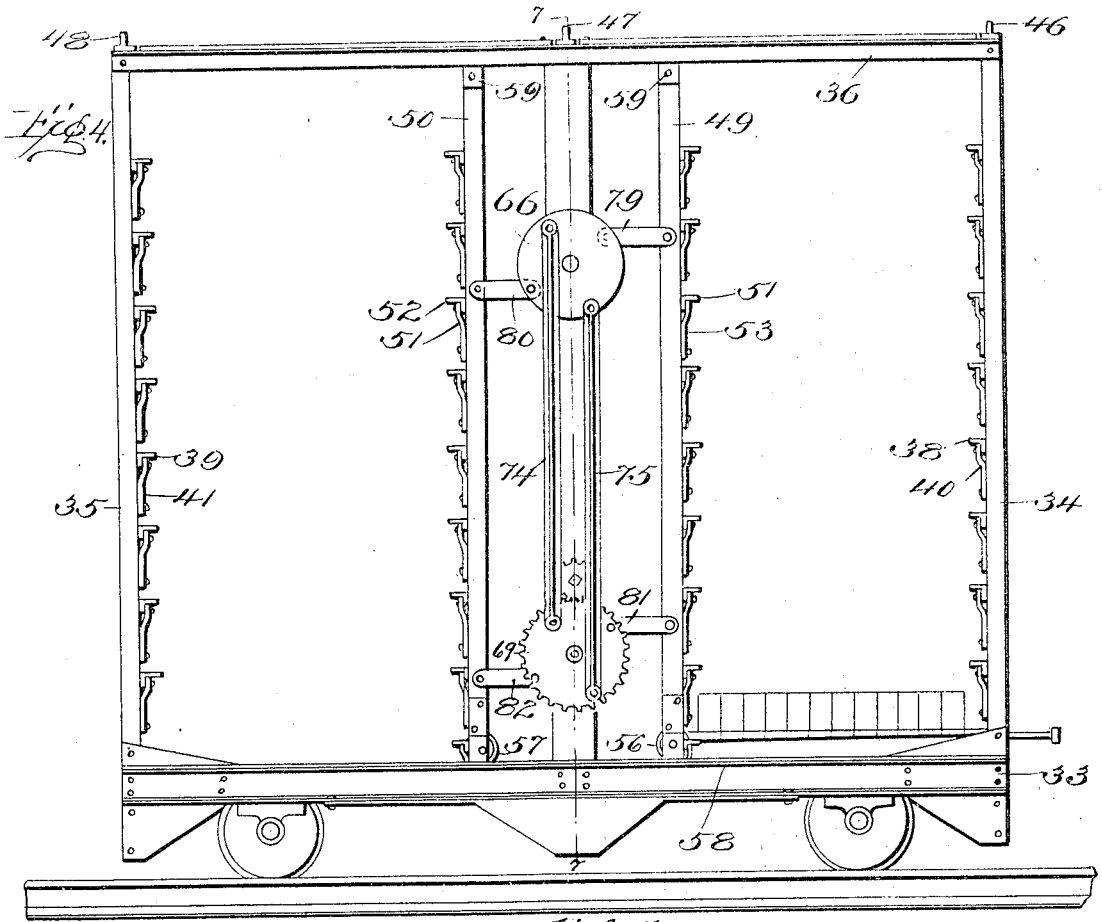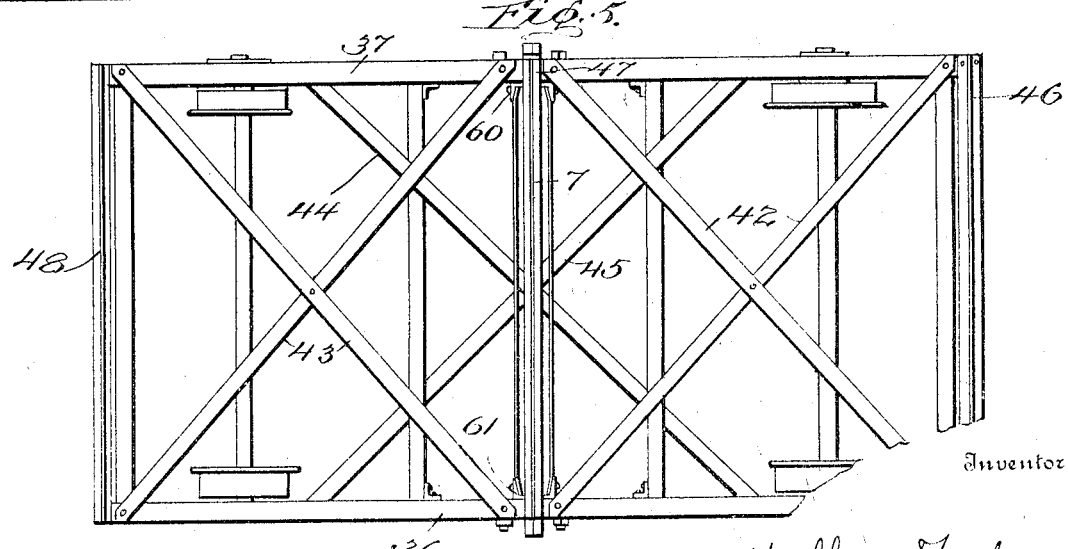

UNITED STATES PATENT OFFICE.

WILLIAM FRIBERG, OF PORTLAND, OREGON.

BRICK-SPREADER PALLET AND TRUCK THEREFOR.

No. 914,262.    Specification of Letters Patent.    Patented March 2, 1909.

Application filed December 3, 1907. Serial No. 404,916.

*To all whom it may concern:*

Be it known that I, WILLIAM FRIBERG, a citizen of the United States, residing at Portland, in the county of Multnomah and State of Oregon, have invented certain new and useful Improvements in Brick-Spreader Pallets and Trucks Therefor; and I do hereby declare the following to be a full, clear, and exact description of the invention, such as will enable others skilled in the art to which it appertains to make and use the same.

This invention relates to improvements in brick spreading pallets and trucks for carrying the same.

The invention comprises the provision of a pallet formed in a plurality of sections formed with interlocking portions and designed to have the various sections separated by a longitudinal pull upon the pallet, the interlocking sections preventing disengagement of the various sections.

The invention further comprises the provision of a truck designed to receive a spreading pallet and arranged to receive the spreading pallet in a closed condition so that at the proper time the truck may have its pallet supporting members operated for spreading all of the pallets positioned thereon.

The invention also comprises a truck formed with pallet supporting members some of which are designed to be moved laterally simultaneously for spreading all of the pallets positioned on the supports therefor.

The object in view is the provision of a brick spreader arranged to receive brick in contact with each other and after having been just cut to properly spread the same without any danger of breaking the brick, in connection with a truck for supporting and operating the spreader as may be desired.

With these and other objects in view the invention comprises certain novel constructions, combinations, and arrangement of parts as will be hereinafter more fully described and claimed.

In the accompanying drawing: Figure 1 is a perspective view of part of a pallet formed according to the present invention, certain parts being broken away to better disclose the construction thereof. Fig. 2 is a vertical longitudinal section through a pallet embodying the features of the present invention. Fig. 3 is a section through Fig. 1 approximately on line 3—3. Fig. 4 is a side elevation of a truck embodying the features of the present invention. Fig. 5 is a top plan view of Fig. 4. Fig. 6 is an end view of Fig. 4. Fig. 7 is a fragmentary sectional view approximately on line 7—7 of Fig. 4.

In constructing my improved pallet I form the same of any desired number of pieces or sections so as to make the same of any convenient length.

In the drawing I have disclosed my preferred construction in which 1 and 2 indicate end pieces which are designed to be of greater width than the remaining sections 3. The end sections 1 and 2 are designed to receive a brick and also leave space for a hand-hold for moving the pallet from one place to another while sections 3 are designed to receive only one brick which substantially covers the same. End piece 1 is made from a piece of sheet metal that is bent into a rectangular form of support and is secured to the top at 5 by solder, rivets or the like. The opposite end of a support 4 is bent down at 6, then horizontally at 7 and finally up again to 8 to a position falling short of the top of the pallet as clearly seen in Fig. 2. This forms a hook-shaped device at one end of section 1 and a rectangular-shaped support at the other end. The support 4 is designed to extend below member 7 and to act as a leg or support for the pallet and also as a stop when the pallet is placed upon a truck hereinafter more fully described. The opposite end member 2 is formed with a supporting leg 9 similar to support 4 for acting as a leg and also as a stop. The sides of the section 1 are bent over at 10 and 11 forming side members, and then again at 12 and 13 for forming a bottom. From the bottoms 12 and 13 the material is bent up at 14 and 15 respectively and again bent for forming securing means 16 and 17. Securing means 16 and 17 are soldered in place or riveted as may be desired at each edge of section 1. Openings 18 and 19 are provided which accommodate supporting and guiding bars 20 and 21. The sides of member 2 are made exactly like the sides of member 1 and the support 9 is similar to support 4 but the end opposite to the support 9 is simply bent down at 22 and forms a stop for one of the intermediate sections 3. The hook-shaped member formed by members 6, 7, and 8 of section 1 do not extend the full width of the section but only from the inner sides 14 and 15 so that bars 20 and 21 do not pass therethrough. The intermediate sections 3 are formed with an upper surface 23 preferably of the width of an ordinary brick. From the upper surface 23 the metal is bent down and forms a hook 24 at one end of the section and bent down at 25 at the opposite end. From the end 25 the material is again bent for forming a bottom or base 26. From the base 26 the material is again bent up at 27 for any desired distance but falling short of the top of the next succeeding stop 23. In this way it will be seen that each of the sections 3 are formed with a bearing surface that is simply bent for forming a stop on one edge for accommodating the next succeeding stop 24. This feature also permits of longitudinal movement of the various sections and is arranged to separate the various stops 23 of the various sections 3.

In operation the pallet is placed with all its sections contacting with each other so that the upper surface will be substantially continuous or in a closed position. Rods 20 and 21 will project out from the end pieces to a considerable extent, preferably just sufficient for permitting the spreading of the various sections so that dependent portion 24 may engage the upstanding portion 8 in all the sections. After the pallet has been placed in position the bricks are then placed thereon in any desired way as by being forced thereon by machinery and then being cut in any desired way, as for instance, by having a wire passed through the clay in line with the edge of each section so that when the bricks are cut there will be one brick on each section and one on each end section or member. The device is then placed upon a truck as hereinafter more fully described, or is spread by hand by simply grasping the end members or sections 1 and 2 and pulling the same until the various sections have separated as seen in Figs. 1 and 2. This will separate or isolate each brick and will also permit air to pass in proximity to the brick on all sides except the bottom, apertures 28 and 29 being provided in each section for permitting the passage of air between the bricks. Secured on the bolts 20 and 21 are nuts 30—30 and 32—32 for preventing the accidental removal of the bolt during the spreading operation.

In connection with the pallet shown in Figs. 1 to 3 inclusive I use a truck seen in Figs. 4 to 7 inclusive. Referring more particularly to these figures 33 indicates a base of any desired or preferable construction that is strong but of no great weight. Mounted on base 33 are uprights 34—34 and 35—35 connected at the upper ends by bars 36 and 37. The uprights 34—34 and 35—35 and bars 36 and 37 are formed from angle iron and arranged to have the flat portions of the bars facing away from each other. One portion of the angle irons 34—34 and 35—35 is facing toward the center of the truck and has secured thereto angle irons 38 and 39 respectively. Suitable braces 40 and 41 respectively are provided for bracing angle irons 38 and 39 and also the entire end of the truck so as to firmly hold the uprights 34—34 and 35—35 from any swinging or side movement. Cross braces 42 and 43 are provided at the upper part of the truck for bracing and securing angle irons 36 and 37 in their proper position. Suitable cross members 44 and 45 are provided in base 33 for more firmly holding the same from any twisting movement. In order to more positively prevent any sagging or inward movement of the said bars 36 and 37 T irons 46, 47 and 48 are provided at the top of the truck. Positioned within the truck opposite uprights 34—34 and 35—35 are another set of uprights 49—49 and 50—50 that are movable longitudinally of the truck or laterally in regard to themselves. The uprights 49—49 and 50—50 carry angle irons 51 and 52 respectively and bracing members 53 and 54 respectively for preventing any twisting in relation to the uprights. At their lower end the uprights carry rollers or antifriction means 56—56 and 57—57 designed to bear against and roll upon channel irons 58 and 59. The uprights 49—49 and 50—50 are formed with angle irons and are designed to project below the lower edge of the top angle irons 36 and 37 and rest against the sides thereof. Upon each of the movable uprights 49—49 and 50—50 are provided stops 59 which are rigidly secured thereto and rest against the lower edge of the angle irons 36 and 37 so that there can be no vertical movement of the movable bars 49—49 and 50—50 though a lateral movement of the bars is permitted.

Rigidly secured to channel irons 59 and angle irons 37 is a channel iron 60 and rigidly secured to channel iron 58 and angle iron 36 is another channel iron 61. The channel irons 60 and 61 are designed to face toward the center of the truck as seen in Fig. 5 so as to present a smooth outer surface. Secured to channel irons 60 and 61 are bearing members 62—62, 63—63 and 64—64. Passing through bearing members 62—62 and through both of the channel irons 60 and 61 is a shaft 65. To the ends of shaft 65 are rigidly secured disks 66 and 67. Passing through bearing 64—64 is another shaft 68 that has secured to the ends thereof disks 69 and 70, the disk 69 being formed with gear teeth on the periphery thereof. The disk or gear 69 is designed to mesh with a smaller gear or disk 71 that is rigidly secured to a shaft 72 which extends across the truck and has formed thereon a squared portion for receiving a crank 73. If desired the crank 73 may be placed upon a squared portion formed on shaft 72 at the end on which gear 71 is secured so that shaft 72 may be rotated from either side. Secured to the disk 66 and the gear wheel 69 are pitmen or connecting links 74 and 75 and secured to disks 67 and 70 are pitmen or connecting rods 77 and 78. The pitmen or links 74 and 75 are secured upon opposite sides of disk 66 and gear wheel 69 so that any motion given to gear wheel 69 will also be given to disk 66. Links or pitmen 77 and 78 are also connected in a similar manner as disks 74 and 75 so that whenever gear wheel 69 is moved the motion is conveyed through shaft 68 to disk 78 and from thence to disk 67. Disks 66 and 67 are connected to the movable uprights by links 81—81 and 82—82. By this arrangement whenever disk or gear 69 is moved or partially rotated links 79—79, 80—80, 81—81 and 82—82 would be moved in or out and consequently uprights 49—49 and 50—50 would be moved toward or from the ends of the truck.

In operation the bricks are placed upon a pallet as seen in Fig. 1 when the pallet is closed and then the pallet together with the bricks in a closed position are placed upon a truck as seen in Fig. 4. In placing the pallet upon the truck the supports or feet 4 and 9 are designed to pass over the outer edges of angle irons 38 and 51 or angle irons 52 and 39 as the case may be. By placing the supports in this position they will act as a hook so that when crank 73 is moved or rotated disks 69, 66, 67 and 70 and movable bars 49—49, 50—50 will move toward the center of the truck and the various sections of the pallet would be pulled apart or separated and consequently separating the bricks thereon.

The truck may be made of any desired size and when in use preferably the same is filled entirely full of the wet or "green" bricks and after being filled is moved to any desired place for drying and after such moving the movable members are operated as just set forth for spreading all of the pallets at one time. The bricks are then left to dry and after drying are disposed of in any usual or preferred manner.

In this way an improved spreader is provided and a truck is provided that will act in conjunction therewith for holding and spreading simultaneously any desired number of pallets.

What I claim is:

1. A brick spreading pallet formed of a plurality of interlocking sections and means for spreading apart the sections in one operation.

2. A brick spreading pallet comprising end members, a plurality of interlocking members, bars for guiding the movement of all the members, and means for limiting the separation of the members.

3. A pallet formed with a plurality of sections provided with interlocking portions, and means for guiding the movement of said sections.

4. A pallet comprising end members formed with a dependent support, intermediate section formed with interlocking members, and means for guiding all of said members for permitting the separation thereof.

5. A pallet formed of a plurality of sections, each section being formed with interlocking members for permitting a limited separation of said members.

6. A pallet comprising end members formed with a support on one edge, a passage way along each end, and a hook-shaped portion along the opposite edge to said support, an intermediate section interlocking with said hook-shaped portion, and means passing through said passage ways and said intermediate sections for guiding the movement of the same.

7. A pallet comprising end members formed with a hooked-shaped portion along one edge, intermediate sections formed with hook-shaped portions along two edges thereof, hook-shaped portion of one section engaging the hook-shaped portion of the other for permitting a lateral movement of each section, passage ways formed in the end of each end member, and passage ways formed in each end of each intermediate section, and a bar passing through passage ways of all of said sections from one end of the pallet to the other for holding in position and guiding said sections when said sections are moved apart.

8. A collapsible pallet formed with a plurality of interlocking sections provided with openings for permitting the passage of air when the pallet is extended.

9. A pallet formed with a plurality of movably interlocking sections and means for guiding the movement of the sections.

10. The combination with a collapsible pallet, of a truck formed with means for supporting said pallet, and means for moving said supporting means.

11. The combination with a pallet, of a truck for receiving the same, formed with means for supporting said pallet, supports for moving part of said supporting means for adjusting said pallet, and means for moving said supports.

12. The combination with a collapsible pallet, of a truck therefor, said truck being formed with a framework having supports thereon for supporting one end of said pallet, movable members positioned in said truck, means for moving said members, supports secured to said movable member for supporting one end of said pallet whereby when said movable members are operated the ends of said pallet will be moved apart and the pallet extended for separating the matter positioned thereon.

13. The combination with a pallet, a truck formed with stationary supports for supporting one end of said pallet, movable supports for supporting the opposite ends of said pallet, bars for supporting said movable supports, anti-friction members secured to one end of said bars, guiding members secured to the opposite end of said bars, and means for moving said bars.

14. The combination with a spreading pallet, of a truck formed with stationary supports supporting one end of said pallet, and movable supports for supporting the other end of said pallet, and means for moving the said movable supports for spreading said pallet.

15. The combination with a spreading pallet, a truck therefor formed with stationary supports, movable supports, means for moving said movable supports, disks for moving said means, and means for moving said disks simultaneously.

16. A collapsible pallet formed with a plurality of sections provided with interlocking portions formed with openings that will permit air to pass between said sections when extended, and means for guiding the movement of said sections.

In testimony whereof I affix my signature in presence of two witnesses.

WILLIAM FRIBERG.

Witnesses:
A. L. VEAZIE,
F. E. BAKER.